Feb. 15, 1938.   F. G. CLARK   2,108,162
BUTTER CHURN
Filed Sept. 13, 1935   2 Sheets-Sheet 1

Inventor
Frank G. Clark

Feb. 15, 1938.  F. G. CLARK  2,108,162
BUTTER CHURN
Filed Sept. 13, 1935  2 Sheets-Sheet 2

Inventor
Frank G. Clark
By Howard L. Fischer
Attorney

Patented Feb. 15, 1938

2,108,162

UNITED STATES PATENT OFFICE 2,108,162

BUTTER CHURN

Frank G. Clark, Minneapolis, Minn.

Application September 13, 1935, Serial No. 40,447

7 Claims. (Cl. 259—89)

This invention relates to butter churns wherein the cream and/or butterfat is plowed or worked toward both ends of the churn, and then toward the middle, in the rotation of the churn. I accomplish this operation in the churn by dividing in the center, the flow of the cream and the butterfat to equalize the strain on the churn, thus directing the churning force toward the middle and then toward each end of the churn in the operation of the same.

In the concussion type of churns, the main object is to work the butter as rapidly as possible with the least amount of friction. For this reason my churn is constructed with a plowing and rolling action, and thus I overcome the sliding or scraping of the butter along a surface which would ordinarily destroy the desirable grain of the butter. My churn is designed with slanting shelves toward the center which operate to move the butter from the center toward both ends and then dropping it, not far enough to mash the grain, but just far enough to elongate the grain one way, and then it is picked up on the other shelf and is moved in the opposite direction toward the center of the churn, whereupon it is dropped as before, only from a different position to squeeze or elongate the grain in the other direction, thereby setting up a more desirable and efficient churning action. Thus with my churn the buttermilk may be more readily worked out of the butter without destroying the grain of the same and the butter may be thoroughly worked in washing and conditioning it with the desired amount of moisture, as well as working in the salt when it is desired.

In my churn in each revolution of the same, I obtain a double working of the butter, giving a better agitation and working so as to obtain a fine texture to the butter in a much shorter time than has been accomplished, I believe, heretofore. Further, my churn with its simple structure has absolute sanitation, is more easily kept clean than the old type of rolling churns where the beaters revolved inside of the churn cylinder and where the churn cylinder also revolved, and yet by the peculiar churning action set up by my particular shelf construction, my churn obtains results which I believe are better than these old types of churns.

A further feature of my churn resides in the rolling action combined with the squeezing action, plus the separating action working from the center toward both ends and from the ends back toward the center, which gives a spreading-out action, coupled with the fall from the shelf to the floor of the drum, all of which takes place in each revolution of the churn, so that the butter may be more quickly worked to the desired texture. These advantages, coupled with the simplicity of construction which makes the churn easily cleaned, makes my churn virtually immune from mold and bacteria which might otherwise collect within the churning chamber.

A feature of my churn resides in angularly disposing and spacing in a peculiar manner, the members which form the agitating shelves or plows in the churn so as to more equally distribute the strain throughout the churn in operation.

I provide within the churn peculiarly different agitating shelves or plows, one of which is formed so as to direct the load toward the center of the churn at the center of the shelf or plow midway between the ends of the churn, while the other shelf or plow which is positioned diametrically opposite to the first shelf, is so constructed as to cause the load to be divided and forced toward the ends of the churn. This is extremely important in the construction and operation of my churn in that it not only equalizes the strain within the same in churning operation, but provides a more efficient agitating means which simplifies the churning operation and working of the butter.

A further feature of my churn resides in the particular construction of the shelves or plows which are channeled longitudinally and have a central longitudinal slot extending therein which forms a longitudinal open channel extending throughout the length of the shelf. The inner shelf portion which is secured to the inner arcuated surface of the churn is shaped to fit the inner wall of the churn. The outer shelf portion extends parallel to the inner portion, and is connected at the center or apex portion which is midway between the ends of the churn, to a plow rib which extends transversely of the shelf and provides a bracket or central bracing portion as well as a divider. Thus in the rotation of the churn, the central dividing rib or brace assists one of the shelves in dividing the liquid being churned and directs it toward the ends of the churn along the shelf. The next shelf picks up the liquid near the ends of the churn and directs it toward the center midway between the ends of the churn, where it is spilled over onto the floor of the churn as the churn rotates, and then picked up by the first shelf or plow, and thus the liquid or cream is thoroughly churned after which the butter is worked in the same manner, giving an even and equal distribution of the churning strain through the entire churn as well as along the shelves.

The central longitudinal opening in the channel-shaped shelves or plows permits some of the liquid and/or butterfat to pass through the same in the churning action to give greater efficiency in the churning action.

There are other features and details of construction of my churn which will be more fully hereinafter set forth.

In the drawings forming part of this specification:

Figures 2, 3:
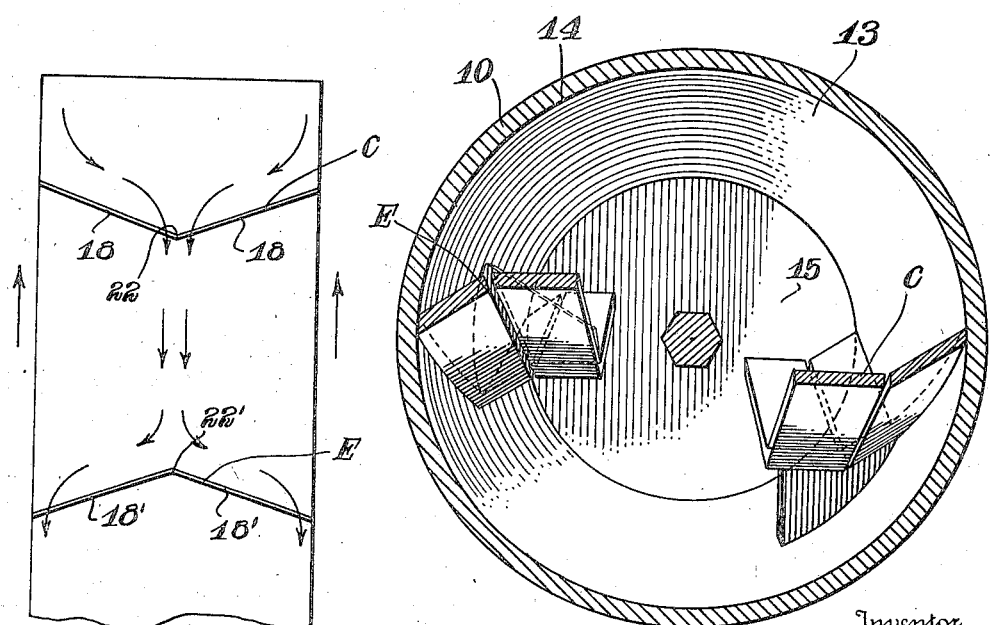
Figure 2 is a sectional perspective view, looking in one end of my churn as if the end of the churn were removed.

Figure 3 diagrammatically illustrates a geometrical development of the inner surface of the churn, showing the relative position of the churning shelves or plows, and showing the direction of flow of the butter fat in relation to the plows with the direction of movement of the churn wall indicated by the side arrows.

Figure 1:
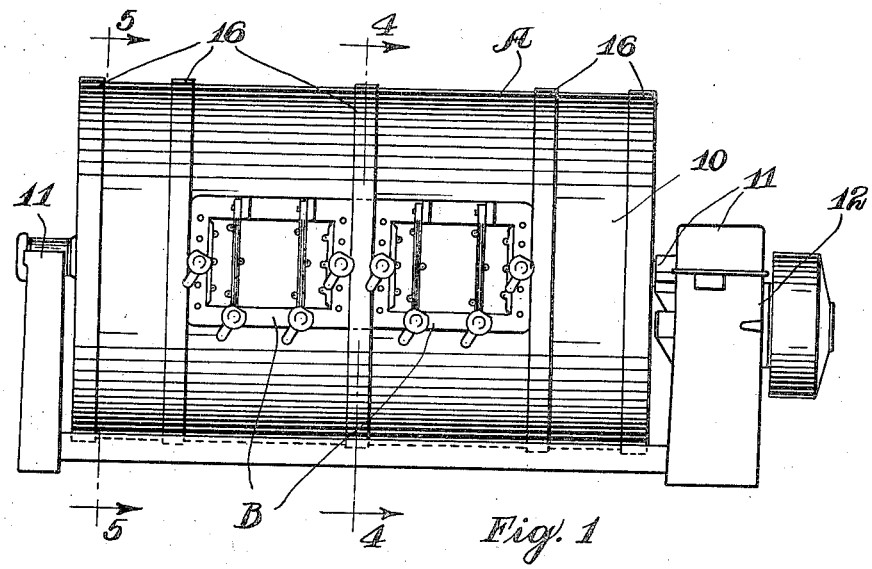
Figure 1 is an outer front side view of my churn as it would appear in use.
Figure 4:
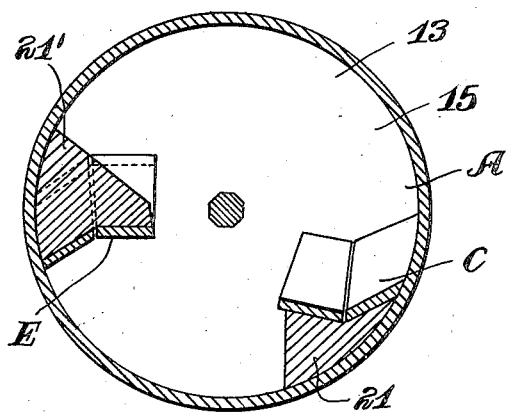

Figure 4 is a section on the line 4—4 of Figure 1.

Figure 5:
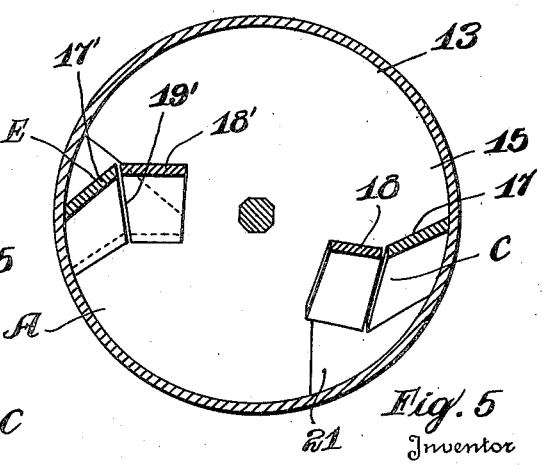

Figure 5 is a section on the line 5—5 of Figure 1.

Figure 6:
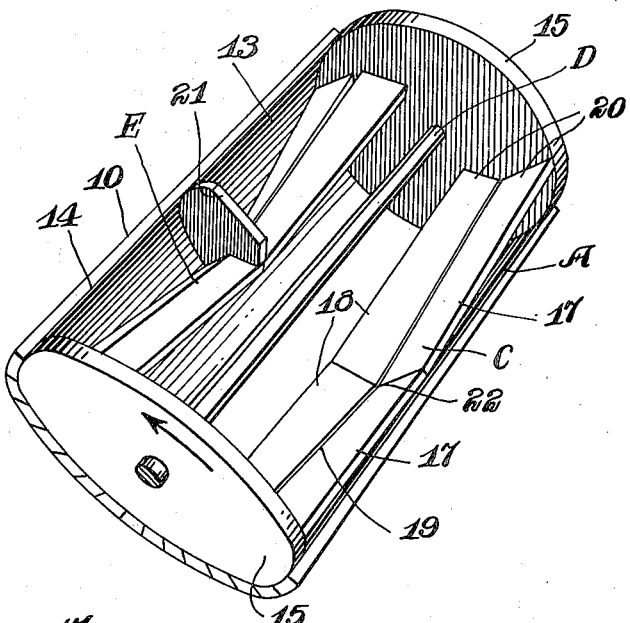

Figure 6 is a perspective detail looking into the churn with the portion of the side wall removed to show the relative position and shape of the plows or shelves and central brace means therefor.

Figure 7:
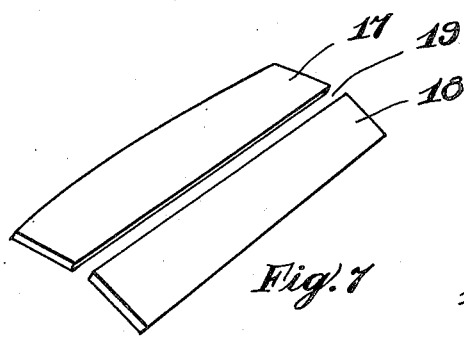

Figure 7 is a perspective view illustrating the pair of shelf members which constitute the inner and outer shelf member of each shelf or plow used in my churn.

The churn A is formed with a cylindrical body portion 10 which is supported in the end bearings 11 so that the body 10 of the churn may rotate freely in the operation of the same. A suitable driving means 12 is provided to operate the churn which may include the driving gearing and brake mechanism for stopping the churn in the desired position.

My churn A is provided with doors B which give free access to the inner chamber 13 of the churn.

The body 10 of the churn is formed with a cylindrical wall 14 and disc-like end walls 15. The doors B are positioned in a suitable and convenient manner within the wall 14. The body 10 of the churn A may be made up of any suitable material and in ordinary construction is preferably formed of wood which is particularly adapted for churns. The cylindrical body 10 may be held together by the hoops 16.

Within the chamber 13 of the churn A, I provide the plow shelves C and E. I also provide an axially disposed beater rod D which may be of any suitable character and which extends between the ends 15 of the churn A. The shelves C and E are made up of two pairs of parallelly disposed plank members 17 and 18 which are positioned in a manner to slope toward each other and spaced apart to provide a longitudinal opening 19 in each of the shelves. The plank members 17 form the inner shelf members while the plank members 18 form the outer shelf members. In the formation of the shelf C, the two pairs of plank members 17 and 18 are positioned with their ends secured at 20 to the end walls 15 of the churn A. The inner ends of the pairs of shelf members 17 and 18 are connected together at the central plow rib 21 which forms a transversely disposed central supporting bracket. It will be apparent that the pairs of members 17 and 18 in the shelf C slope toward the center 22 from the end walls 15 so as to provide the plow C with a shape adapted to form a longitudinal channel from one end wall 15 to the other, with each pair of members 17 and 18 sloping to the center point 22 of the plow shelf C, thereby providing a plow shelf which will collect the butter fat spilled from the ends of the shelf E onto the ends of the shelf C. When the butter fat is collected onto the shelf C, it is directed toward the central point 22 of the same and there it is spilled over onto the central portion of the shelf E. The shelf E is formed with similar pairs of plank members 17' and 18' to those of the shelf C, which are spaced apart to form the longitudinal central channel 19' and which operate to plow and churn the butter fat within the chamber 13 during the rotation of the churn A. The pairs of plank members 17' and 18' making up the shelf E are adapted to extend from the end walls 15, sloping upward toward the central point 22' so as to form an apex at this central point in the plow E. The central portion of the shelf E is supported by the transversely disposed plow rib 21'.

In the rotation of the body 10 of the churn A, it will thus be apparent that the plow C will collect the butter fat to the central point 22, spilling it over onto the central apex or point 22' of the plow shelf E, whereupon the shelf E will direct the butter fat to the ends 15 of the churn, and as the churn rotates as is shown in the direction of the arrows in Figure 3 and in Figure 6, the plows C and E will continue to agitate the butter fat within the churn A by the peculiar action of directing the force of the agitation toward the center 22 by the plow C and from the central point 22' of the plow E the force or strain of the liquid being churned within the churn will be directed toward the ends 15. Therefore in my churn the plows act to simultaneously direct the churning force away from the ends 15 and toward the ends 15 on the opposite sides of the churn. The dished or channeled shape of the plows C and E, with the central openings 19 and 19', more thoroughly agitates the butter fat within the churn.

My churn A is designed to operate with a uniform distribution of the churning load within the same, thereby causing the churn to be more efficient in obtaining the greatest possible churning or agitating action throughout the churn from end to end, dividing the churning load within the same so as to overcome any loading or strain toward any particular spot within the churn and rather spreading it out or equally distributing the same within my churn A. I have found this construction of churn to be more desirable and efficient, because of the spreading out and equally distributing of the churning load within the entire area of the churn.

I claim:

1. A butter churn or the like, comprising a rotatable body portion having a chamber therein for receiving the cream or liquid to be churned, plow shelves positioned within said body and held stationary with the inner wall of said body and extending throughout the length thereof, said plow shelves being spaced apart circumferentially on the inner surface of said body and having a central apex portion ahead of the ends thereof during rotation to equalize the churning load within said churn, thereby dividing and equalizing the churning strain on the shelves and against the wall and ends of said churn throughout the operation thereof.

2. A butter churn and the like, including a rotatable body portion, means for rotating the same, continuous churning plow shelves formed within said body and adapted to rotate therewith, said plow shelves having a construction wherein a longitudinal open channel is formed throughout the length of each shelf, a structural apex dividing portion formed in each shelf midway between the ends of said churn, sloping portions extending angularly from the ends of the churn toward said apex portion, one of said shelves having the apex behind the ends thereof during rotation directing the churning load toward the center of the churn and the other having the apex thereof ahead of the ends during rotation, directing the load toward the ends thereof, each of said shelves being fitted to the inner wall of said churn to cause a spill-over action of the liquid as it strikes or is struck by the plow shelves, causing the liquid to spill over the edge of the shelf and to pass through the longitudinal slotted channel formed therein and equalizing the churning strain throughout the length of said shelf and the body of said churn.

3. A churn for butter and the like, comprising a rotatable cylindrical body, a pair of churning plows spaced diametrically opposite and fitted and fixed to the wall and ends of the churn, one of said plows having a longitudinal inwardly sloping channel open at the depth of the channel, and having its central portion sloping toward a point centrally between the ends of said churn body and having this central point behind the ends of the plow during rotation and the other of said plow shelves having a longitudinal channel with a longitudinal opening in the depth of the channel and sloping upward to an apex at a point midway between the ends of the body of said churn, this apex being ahead of the ends of the plow during rotation.

4. A butter churn including a cylindrical body, means for rotating said body in one direction, a pair of continuous churning shelves within said body extending from end to end of said churn body, each of said shelves being formed with a central apex portion, a longitudinally extending channeled opening extending throughout the length of said shelves, dividing each shelf into inner and outer members, a central reinforcing plow rib brace member, the inner member of said shelves being fitted to the arcuated surface of the inner wall of said churn body, one of said shelves having the apex portion behind the ends thereof during rotation to cause the strain of the churning load to be directed toward the center of said one shelf, and then the next of said shelves, having the apex thereof ahead of the ends thereof during rotation, causing the strain of the churning load to be directed toward the ends of said churn body.

5. A butter churn including a cylindrical rotatable body, means for rotating said body in one direction, continuous churning shelves or plows positioned within said cylindrical body, one of said shelves being formed with a central depressed portion behind the ends thereof during rotation and the other with a central projecting apex portion ahead of the ends thereof during rotation, one of said plow shelves directing the load toward the center of the churn between the ends thereof and then the other shelf directing the load toward the ends of the churn to equalize the strain of the churning load throughout the area of the churn during the entire churning operation.

6. A butter churn or the like comprising a cylindrical body, means for rotating said body, longitudinally disposed continuous churning plow shelves fitted to the inner arcuated wall of said churn body extending from end to end of said body, longitudinal open slots formed in each of said plow shelves, said shelves being formed with a longitudinal channel throughout the length having the depth of the channel at the open longitudinal slot of the shelf, one of said plow shelves having the center thereof behind the ends during rotation thereby positioned to direct the load of churning toward the center and the other of said shelves having the center thereof ahead of the ends during rotation, thereby directing the load toward the ends, thus alternating the strain from the center to the ends and from the ends to the center throughout the entire churning operation as the body of the churn rotates.

7. A churn comprising a cylindrical rotatable body, continuous churning plows fixed within said body and extending longitudinally throughout the length of said churn and attached to the inner walls thereof, central brace members for each of said plows, one of said plows having a central apex ahead of the plow ends during rotation to distribute the churning load from the center toward the ends, and the other of said plows directing the load from the ends toward the center in the operation of said churn, said other plow having a central apex behind the ends during rotation.

FRANK G. CLARK.